United States Patent [19]

Arrighetti et al.

[11] 4,127,617

[45] Nov. 28, 1978

[54] SHOCK-RESISTANT RESIN AND METHOD FOR THEIR PREPARATION

[75] Inventors: Sergio Arrighetti, Milan; Aldo Brancaccio, Cremona; Sebastiano Cesca; Giampaolo Guiliani, both of San Donato Milanese (Milan), all of Italy

[73] Assignee: Anic, S.p.A., Palermo, Italy

[21] Appl. No.: 724,602

[22] Filed: Sep. 20, 1976

[30] Foreign Application Priority Data

Oct. 3, 1975 [IT] Italy .............................. 27951 A/75

[51] Int. Cl.$^2$ ............................................ C08F 255/06
[52] U.S. Cl. ............................................ 260/878 R
[58] Field of Search ....................... 260/878 R, 880 R

[56] References Cited

U.S. PATENT DOCUMENTS

| 3,236,917 | 2/1966 | Natta | 260/878 R |
| 3,687,905 | 8/1972 | Dorer | 260/878 R |
| 3,708,555 | 1/1973 | Gaylord | 260/878 R |
| 3,882,194 | 5/1975 | Krebaum | 260/878 R |
| 3,981,958 | 9/1976 | Nakashima | 260/878 R |

*Primary Examiner*—Paul R. Michl
*Attorney, Agent, or Firm*—Morgan, Finnegan, Pine, Foley & Lee

[57] ABSTRACT

Improved shock-resistant resins are obtained by graft-copolymerizing a monomer selected from among alkenyl aromatics, vinylics, acrylics, their halogenated derivatives or admixtures of same, with maleic anhydride and/or an imide derivative of such anhydride and with a terpolymer composed by ethylene, a higher homolog of ethylene and a polyene having at least one system of conjugated double bonds.

5 Claims, No Drawings

SHOCK-RESISTANT RESIN AND METHOD FOR THEIR PREPARATION

This invention relates to the preparation of novel shock-resistant resins, which also withstand the outdoor aging and are characterized by a high temperature of deformation in hot conditions: the invention is also related to the resins thus obtained.

More particularly, such resins are obtained by grafting on elastomeric terpolymers based on ethylene, propylene and a polyene, of mixtures of vinyl-aromatic, acrylic monomers with maleic anhydride and its amide derivatives.

It is known that shock-resistant resins can be obtained by grafting vinyl aromatic monomers or vinyl halides, either alone or in admixture with acrylic compounds in general, both on highly unsaturated rubbers, such as polybutadiene, and on low-unsaturated rubbers such as the terpolymers based on ethylene, propylene and a polyene (U.S. Pat. No. 3,358,131).

The use of rubbery materials having a low contents of unsaturations, such as the terpolymers based on ethylene and propylenein the synthesis of shock-resistant resins, enables materials to be obtained, which have an aging resistance which is positively higher than that of the materials which are obtained by using highly unsaturated rubbers.

More particularly, the use of rubbers based on ethylene, propylene and a polyene, containing a system of conjugated double bonds, as disclosed in the U.S. Patent Application No. 519799 by the same applicants thereof, provides a further improvement in this direction, on account of the very low percentage of unsaturations which are present.

However, a limitation to all the shock-resistant materials as considered heretofore is that they cannot be used for the production of articles or artifacts for which the use is predicted at temperatures above 90° C.–100° C., due to the comparatively low values of the distortion temperature under load in hot conditions (Hot according to the ASTM specification D 648) which, in the case of ABS resins, lies in the range from 80° C. and 87° C. and, in the case of the resins based on an olefin terpolymer, attains values ranging from 90° C. to 96°·C.

It has now been found that the use of maleic anhydride and its imide derivatives in the reaction for grafting the vinyl aromatic and acrylic monomers on the elastomeric phase constituted by an olefin elastomer based on ethylene, propylene and a polyene, is conducive to materials having a high temperature of distortion in hot conditions, a high resistance to shocks and a high stiffness.

These resins, which in addition exhibit fair machinability properties and an improved resistance to aging over analogous polybutadiene-based resins, are particularly recommendable for the production of articles for which a use at comparatively high temperatures and for rather long times are expected.

The monomers which can be used, either alone, or in admixture in the synthesis of shock-resistant materials having improved properties by grafing on an olefin terpolymer, are:

(a) alkylaromatic monomers such as: styrene, dimethyl-styrene, dialkyl-styrene, chlorostyrene and, more generally, derivatives of styrene, vinylnaphthalenes, substituted vinylnaphthalenes;

(b) vinyl-, or vinylidene halides, such as vinyl chloride and vinylidene chloride;

(c) acrylic monomers having the general formula:

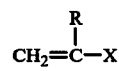

wherein R is H or an alkyl group from 1 to 5 carbon atoms and X is selected from the group consisting of:

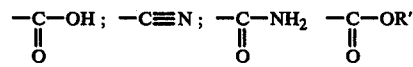

wherein R' is an alkyl group containing from 1 to 9 carbon atoms.

In addition, as outlined above, it is of vital importance, to the ends of the invention as claimed in the present patent application, that the monomers enumerated above under (a), (b) and (c) be employed together with maleic anhydride and/or its imide derivatives having the general formula:

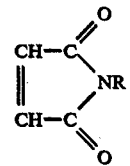

wherein R is H or an alkyl having from 1 to 10 carbon atoms, either linear or branched, or cycloalkyls, or substituted cycloalkyls or aromatic polycyclics. The maleic anhydride derivatives which are introduced in the mixture of the monomers to be grafted onto the elastomeric phase contributed to from 1% to 50% by weight, preferably from 10% to 30%.

The elastomeric terpolymers which can be employed according to the present invention are all those which are formed in ethylene, a higher homolog of ethylene and a polyene.

Special advantages have been achieved by employing terpolymers constituted by ethylene, propylene and a polyene containing at least one system of conjugated double bonds, such as those selected from the terpolymers disclosed in the Italian Patent Specifications Nos. 753 804, 813 867, 843 706, 851 691, 851 694, 864 061, 885 567, 885 568, 885 727, 885 729.

The monomers enumerated above can be used in appropriate mixtures and copolymerized simultaneously by concurrent grafting reaction on the elastomeric phase.

The grafting reaction on the elastomer can be carried out by copolymerizing the appropriate mixture of the above enumerated monomers in bulk, in suspension, in emulsion or in solution with an aromatic, aliphatic solvent or an alkyl or an aryl oligomer.

As solvents, there can also be used mixtures of one or more of those indicated above, as well as mixtures thereof with polar solvents, more particularly acetone, ketones, ethers, esters and others.

As an initiator, any catalyst which is adapted to priming radical reactions can be used, such as persulfuric acid, paracetic acid, potassium persulfate, benzoyl peroxide, lauroyl peroxide, di-tert.butyl peroxide, dicumyl peroxide, and also azoderivatives such as azo-bis-isobutyronitrile.

The preparation of antishock resins according to the present invention is carried out according to the methods aforementioned, starting from mixtures of the monomers of interest, according to the following ratios:

terpolymer from 1% to 25% by weight with respect to the total of the reacted species;

maleic anhydride and/or imide derivative of maleic anhydride from 1% to 50% by weight relative to the total species reacted, the balance being the monomers described in paragraphs a) b) and c) indicated above of an admixture of them.

The examples which follow are intended as an illustration of the present invention and are not intended as limitations thereto, in any wise.

EXAMPLE 1

The preparation is described of a typical shock-resisting resin as prepared with no imide derivatives of maleic anhydride being present.

A 2-liter, three-necked flask equipped with bubble condenser is charged, in a nitrogen atmosphere, with 15 grams of a terpolymer composed by ethylene, propylene and 1-isopropylidenecyclopentadiene having the following properties:

$C_2H_4$; 66% by weight

[$\eta$] tol. 30° C.; 1.71 dl/g double bonds in 1000 C atoms 2.4

There are added 450 grams of a mixture composed by 50 parts by weight of benzene and 50 parts of heptane and are stirred at room temperature until such time as the polymer has dissolved.

The terpolymer solution is then supplemented with 1.2 grams of benzoyl peroxide, 116 grams styrene, 40 grams acrylonitrile and reacted during 8 hours at 83° C. in a nitrogen atmosphere.

The reaction product is then precipitated in 3 liters isopropanol, filtered off and dried at room temperature in a vacuo.

There are obtained 153 grams of resin the properties of which are reported in TABLE 1.

EXAMPLE 2

The procedure of Example 1 is followed by employing 17 grams of olefin terpolymer with the same properties of the one used in Example 1 and with the same amounts of monomers and solvents as in Example 1.

The reaction mixture is initially supplemented with 15 grams of N-phenyl maleic imide.

On completion of the reaction there are obtained 170 grams of resins the characteristics of which are tabulated in TABLE 1.

As can be seen in TABLE 1, with the addition of the maleic imide derivative a resin has been obtained having a hot distortion temperature (HOT) which is much higher than that of the material of Example 1, a higher stiffness and a good resistance to shocks.

EXAMPLE 3

The procedure of Example 2 has been repeated by adding 15 grams of N-maleic imide at the very start. There are obtained 172 grams of a resin the properties of which are described in TABLE 1.

Also the maleic imide has the effect of improving the properties of the resins, especially the modulus and the H.O.T.

EXAMPLE 4

By operating under the same conditions as in Example 1, the reaction is carried out with a 5.2% solution in benzene only of a rubbery terpolymer based on ethylene, propylene and 2-(2',4'-dimethyl-penta-1',3'-dienyl)-nor. born-5-ene having the following properties:

$C_2H_4$; 60% by weight

[$\eta$] tol. 30° C.; 1.95 dl/g double bonds per 1000 C atoms 2.7

Prior to starting the reaction, there are added 15 grams of N-terbutyl maleic imide. There are obtained 161 grams of a product the properties of which are tabulated in TABLE 1.

EXAMPLE 5

The procedure of Example 1 is followed by reacting a 6% solution in n-heptane of a terpolymer based on ethylene, propylene and (2-nor.born-5-enyl)-(cyclohexa-1', 3'-dienyl-2', 5'-trimethyl)-methane having the following properties:

$C_2H_4$; 62% by weight

[$\eta$] tol.30° C. 2.1 dl/g double bonds in 1000 C atoms 3.0

Prior to starting the reaction, there are added 16 grams of N-(beta-naphthyl)-maleic imide.

There are obtained 155 grams of resin the properties of which are tabulated in TABLE 1.

EXAMPLE 6

The Example 2 has been repeated with 19 grams of a terpolymer based on ethylene, propylene and 1-isopropylene-dicyclopentadiene, adding 25 grams of maleic amide.

There are obtained 177 grams of a resin the properties of which are tabulated in TABLE 1. As can be seen, by increasing the contents of the fed in maleic imide it becomes possible to obtain materials which have a still higher H.O.T. value.

EXAMPLE 7

In 100 mls of n-hexane there are dissolved 8 grams of a terpolymer base on ethylene, propylene and 5-ethylidene-nor.born-1-ene having the following properties:

$C_2H_4$; 63% by weight

[$\eta$] tol. 20° C.; 1.71 dl/g

% double bonds on 1000 C atoms; 8.2

The solution of the terpolymer in hexane is dripped at room temperature in a de-aerated flask equipped with a stirrer and containing 100 mls of a 2% aqueous solution (on a weight basis) of potassium resinate (salts of a mixture of resinic acids).

An extremely fine suspension is formed which is emulsified in an homogeneizer. The solvent is then removed by steam stripping.

The resultant latex is allowed to stand 80 hours and separated from the aqueous fraction which is separated.

The final emulsion is introduced in a de-aerated flask equipped with a reflux condenser, a thermometer and supplemented with 3 grams of tert.butyl-peroxypivalate, a solution formed by 35 grams styrene, 15 grams acrylonitrile and 5 grams of N-phenyl maleic imide. The mixture is heated to 50° C. during 72 hours, whereafter it is allowed to cool and the final product is recovered by flocculation by addition of sodium acetate.

There are obtained 51 grams of a resin, the properties of which are reported in TABLE 1.

EXAMPLE 8

A 2-liter, three-necked flask equipped with a reflux condenser and stirrer, is charged, in a nitrogen atmosphere, with 170 grams of a solution composed by 116 grams of styrene, 15 grams of N-phenyl maleic imide.

5 grams of a styrene-acrylonitrile copolymer and 20 grams of a terpolymer based on ethylene, propylene and 5-ethylidene-nor. born-1-ene having the following properties:

$C_2$; 57% by weight
$[\eta]$ tol. 30° C.; 1.65
% double bonds on 1000 C atoms; 8.5

To the solution there are added by dripping and with energetic stirring 40 grams of acrylonitrile.

There is obtained a very fine suspension of terpolymer of the monomer mixture which is reacted during 1 hour at 70° C. after addition of 1.35 grams of benzoyl peroxide.

The resultant viscous mass is slurried in 500 mls of water containing 5 grams of sodium salts of a mixture of resinic acids and stirred vigorously until an extremely fine suspension is obtained.

The suspension obtained, after a further addition of 1 gram of benzoyl peroxide is reacted 20 hours at 70° C.

The reaction product is coagulated in 2 liters of isopropanol, filtered off and dried. There are obtained 161 grams of end resin the properties of which are tabulated in TABLE 1.

EXAMPLE 9

Under the same procedure and conditions of Example 2, the reaction is conducted by employing the same terpolymer based on 1-isopropylidene-dicyclopentadiene.

The reaction mixture is supplemented with 20 grams of maleic anhydride.

On completion of the reaction, there are obtained 171 grams of resin the properties of which are tabulated in TABLE 1.

TABLE I

| Example No | Izod impact test (kg.cm/cm$^2$) (1) | Modulus (E) kg/cm$^2$ (2) | Rockwell hardness (R) (3) | H.D.T. (4) |
|---|---|---|---|---|
| 1 | 22 | 26.000 | 109 | 93 |
| 2 | 20 | 30.000 | 117 | 105 |
| 3 | 18 | 31.400 | 115 | 100 |
| 4 | 19 | 28.000 | 113 | 103 |
| 5 | 16 | 26.500 | 111 | 99 |
| 6 | 23 | 31.500 | 115 | 117 |
| 7 | 13 | 28.000 | 109 | 101 |
| 8 | 9 | 30.500 | 114 | 110 |
| 9 | 21 | 29.500 | 117 | 107 |

The mechanical properties have been tested after homogeneization of the resins on an open mixer (T = 180° C) during 10 mins. and compression moulding p = 40 kg/cm$^2$ T = 200° C 10 mins.
1) According to specm. ASTM D 256 (Izod impact test with a ½ by ¼ in.notch)
2) According to specm. ASTM D 790
3) According to specm. ASTM D 785
4) According to specm. ASTM D 648 (Heat Distortion Temperature - Load 18.5 kg/cm$^2$

What we claim is:

1. A shock resistant resin formed by grafting (a) a mixture of styrene and acrylonitrile, and (b) N-phenyl maleic imide onto (c) a terpolymer of ethylene, propylene and 1-isopropylidenedyclopentadiene.

2. A shock resistant resin formed by grafting (a) a mixture of styrene and acrylonitrile, and (b) a mixture of N-phenyl maleic imide and N-maleic imide onto (c) a terpolymer of ethylene, propylene and 1-isopropylidenedyclopentadiene.

3. A shock resistant resin formed by grafting (a) a mixture of styrene and acrylonitrile, and (b) N-tert-butyl maleic imide onto (c) a terpolymer of ethylene, propylene and 2-(2',4'-dimethyl-penta-1',3'-dimethyl)-nor-born-5-ene.

4. A shock resistant resin formed by grafting (a) a mixture of styrene and acrylonitrile, and (b) N-(betana-phythyl)-maleic imide onto (c) a terpolymer of ethylene, propylene and (2-nor-born-5-enyl)-(cyclohexa-1'3'-dimethyl-2',5'-trimethyl)-methane.

5. A shock resistant resin formed by grafting (a) a mixture of styrene and acrylonitrile, and (b) a mixture of N-phenyl maleic imide and maleic imide onto (c) a terpolymer of ethylene, propylene and 1-isopropylene-dicyclopentadiene.

* * * * *